(12) United States Patent
Endou

(10) Patent No.: US 10,048,674 B2
(45) Date of Patent: Aug. 14, 2018

(54) MACHINING SYSTEM HAVING FUNCTION OF RESTRICTING OPERATIONS OF ROBOT AND MACHINE TOOL

(71) Applicant: FANUC Corporation, Yamanashi (JP)

(72) Inventor: Takahiro Endou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 256 days.

(21) Appl. No.: 15/013,087

(22) Filed: Feb. 2, 2016

(65) Prior Publication Data

US 2016/0224013 A1    Aug. 4, 2016

(30) Foreign Application Priority Data

Feb. 3, 2015  (JP) .................................. 2015-19380

(51) Int. Cl.
*G06F 19/00* (2018.01)
*G05B 19/4061* (2006.01)
*G05B 9/02* (2006.01)

(52) U.S. Cl.
CPC ........... *G05B 19/4061* (2013.01); *G05B 9/02* (2013.01); *G05B 2219/40317* (2013.01); *G05B 2219/50193* (2013.01)

(58) Field of Classification Search
CPC .................. G05B 19/4061; G05B 9/02; G05B 2219/50193; G05B 2219/40317
See application file for complete search history.

(56) References Cited

U.S. PATENT DOCUMENTS

| | | | | |
|---|---|---|---|---|
| 5,189,624 A | * | 2/1993 | Barlow | G05B 19/182 700/169 |
| 5,666,010 A | * | 9/1997 | Stratiotis | F16P 1/00 307/326 |
| 5,796,341 A | * | 8/1998 | Stratiotis | F16P 1/00 307/326 |
| 9,513,606 B1 | * | 12/2016 | Larsen | G05B 9/02 |
| 9,862,094 B2 | * | 1/2018 | Nakajima | B25J 9/1666 |
| 2006/0214618 A1 | * | 9/2006 | Hashimoto | G05B 19/406 318/445 |
| 2008/0150467 A1 | | 6/2008 | Hashimoto et al. | |
| 2010/0061830 A1 | | 3/2010 | Kitayama et al. | |

(Continued)

FOREIGN PATENT DOCUMENTS

CN    101204811 A    6/2008
CN    202021500 U    11/2011
(Continued)

OTHER PUBLICATIONS

Office Action in CN Application No. 201610073601.4, dated Jun. 2, 2017.
(Continued)

*Primary Examiner* — Michael D Masinick
(74) *Attorney, Agent, or Firm* — Hauptman Ham, LLP

(57) ABSTRACT

When a machining system that includes a machine tool and a robot detects that an operator is present in a dangerous area in the system, a robot controller that controls the robot determines an operation restriction on the machine tool and notifies a numerical controller that controls the machine tool of the determined operation restriction. The numerical controller restricts the operation of the machine tool in accordance with the notified operation restriction.

12 Claims, 4 Drawing Sheets

(56) References Cited

U.S. PATENT DOCUMENTS

| | | | | |
|---|---|---|---|---|
| 2011/0098830 A1* | 4/2011 | Weddingfeld | ........... | G05B 9/02 |
| | | | | 700/79 |
| 2014/0277725 A1* | 9/2014 | Kouno | ................... | B25J 9/1676 |
| | | | | 700/255 |
| 2014/0316565 A1* | 10/2014 | Aoyama | .................... | B25J 9/16 |
| | | | | 700/249 |
| 2016/0375582 A1* | 12/2016 | Nakajima | .............. | B25J 9/1666 |
| | | | | 700/255 |

FOREIGN PATENT DOCUMENTS

| | | |
|---|---|---|
| DE | 102007037404 A1 | 2/2009 |
| JP | 59-169747 A | 9/1984 |
| JP | 5-146977 A | 6/1993 |
| JP | 2002-054791 A | 2/2002 |
| JP | 2003-107170 A | 4/2003 |
| JP | 2006-043862 A | 2/2006 |
| JP | 2007-283450 A | 11/2007 |
| JP | 2010-64158 A | 3/2010 |

OTHER PUBLICATIONS

Decision to Grant a Patent in JP Application No. 2015-019380, dated Jun. 7, 2016.
Office Action in DE Application No. 102016101385.4, dated Nov. 20, 2017, 9pp.
Siemens AG, Company brochure, Laserscanner SIMATIC FS600, Apr. 2009, 1-24pp, Nürnberg.

* cited by examiner

MACHINING SYSTEM HAVING FUNCTION OF RESTRICTING OPERATIONS OF ROBOT AND MACHINE TOOL

RELATED APPLICATIONS

The present application claims priority to Japanese Application Number 2015-19380, filed Feb. 3, 2015, the disclosure of which is hereby incorporated by reference herein in its entirety.

BACKGROUND OF THE INVENTION

1. Field of the Invention

The present invention relates to machining systems and, in particular, to a machining system that can efficiently ensure the safety of an operator in a machining system formed of elements including a machine tool and a robot.

2. Description of the Related Art

In the past, in a machining system in which a robot and a machine tool are included as component elements, in order to establish a machining system having high productivity, the operation speed of the robot, the door opening and closing speed and the shaft feed speed of the machine tool, and so forth have been increased based on the premise that an operator does not enter the system. However, in recent years, the development of "a robot that does not require a safety fence" which makes it possible for an operator to perform operation such as replacement of a pallet and replenishment of workpiece without stopping the operation of a robot has been advanced.

These robots use a sensor and the operations thereof are restricted depending on the distance between the operator and the robots. If these robots are applied to a robot system, since the operator also gains access to the machine tool provided in the same machining system, as described in Japanese Patent Application Laid-Open No. 2003-107170 and Japanese Patent Application Laid-Open No. 2002-054791, for example, it is necessary to add another sensor for use in restricting the operation of the machine tool.

Moreover, the technique of making it possible to perform safe and efficient operations even in an environment in which a robot and an operator are close to each other by making it possible to change at any time the operation range of the robot and the forbidden area for the operator by using a sensor and a safety controller is disclosed in Japanese Patent Application Laid-Open No. 2007-283450. Furthermore, the technique of restricting the operation range of a robot by setting the operation area of an operator by attaching a receiver to the robot and a transmitter to the operator and detecting the position of the operator with respect to the robot based on the information obtained by the receiver and the transmitter is disclosed in Japanese Patent Application Laid-Open No. 2006-043862.

However, in order to introduce the techniques disclosed in the above-described patent documents, it is necessary to install a sensor for an operation restricting sensor for each of the robot and the machine tool in order to ensure the safety of the operator, which poses a problem in terms of costs. On the other hand, if the operation speed of the machine tool is increased, giving weight to efficiency as in the existing techniques, without installation of a sensor, attaching importance to costs, when the operator performs operations such as replacement of a pallet and replenishment of workpiece or erroneously enters an area near the machine tool, the operator may be exposed to danger, for example, chips, a workpiece not fixed in an adequate manner, or the like are thrown out of the machine tool when the door is opened and closed or a table, a column, or a spindle operates at high speed. However, if the operation of the machine tool is restricted in order to ensure the safety of the operator, the operation is restricted even when the operator is not present, which reduces efficiency.

SUMMARY OF THE INVENTION

An object of the present invention is accordingly to provide a machining system that can efficiently ensure the safety of an operator without adding new sensor and wiring to a machine tool in a machining system formed of elements including the machine tool and a robot.

A first aspect of the machining system according to the present invention includes a machine tool that is controlled by a numerical controller and a robot that performs operations by being controlled by a robot controller. The machining system further includes an operator detecting device that detects whether or not an operator is present in an area in which the operator in the machining system is exposed to danger. In addition, the robot controller includes an operation determining portion that determines an operation restriction on the machine tool based on a detection result obtained by the operator detecting device, and a notifying portion that notifies the numerical controller of an operation restriction determined by the operation determining portion. On the other hand, the numerical controller is configured to restrict an operation of the machine tool in accordance with the operation restriction notified by the notifying portion.

The operation determining portion may include an operator's position calculating portion that calculates a distance between the machine tool and the operator from the detection result obtained by the operator detecting device and is configured to determine, based on an operator's position calculation result obtained by the operator's position calculating portion, an operation restriction on the machine tool.

A second aspect of the machining system according to the present invention includes a machine tool that is controlled by a numerical controller and a robot that performs operations by being controlled by a robot controller. The machining system further includes an operator detecting device that detects whether or not an operator is present in an area in which the operator in the machining system is exposed to danger. In addition, the numerical controller includes an operation determining portion that determines an operation restriction on the robot based on a detection result obtained by the operator detecting device, and a notifying portion that notifies the robot controller of an operation restriction determined by the operation determining portion. On the other hand, the robot controller is configured to restrict an operation of the robot in accordance with the operation restriction notified by the notifying portion.

The operation determining portion may include an operator's position calculating device that calculates a distance between the robot and the operator from the detection result obtained by the operator detecting device and is configured to determine, based on an operator's position calculation result obtained by the operator's position calculating device, an operation restriction on the robot.

The operation determining portion may have at least two operation restriction levels, includes a memory that stores contents and settings of operation restrictions corresponding to the operation restriction levels, and sets the operation restrictions stored in the memory by selecting the operation restriction level.

With the present invention, it is possible to provide, in the machining system formed of elements including the machine tool and the robot, a machining system that can efficiently ensure the safety of an operator without adding new sensor and wiring to the machine tool.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

In the present invention, in a machining system formed of elements including a machine tool and a robot, the safety of an operator is ensured if the machine tool and the operator are close to each other by imposing restrictions on the opening and closing speed of a door of the machine tool and the table feed speed and the spindle rotational speed observed when the door is opened without adding new sensor and wiring to the machine tool and, if there is a sufficient distance between the machine tool and the operator, the operation of the machine tool is sped up by a method which, for example, makes acceleration and deceleration of table feed and spindle rotation and opening and closing of the door overlap one another by lifting restrictions on the table feed speed and the spindle rotational speed observed when the door is opened.

More specifically, the robot calculates the distance between the operator and the machine tool from the detection result obtained by a sensor provided for safety measures against the robot, and the door opening and closing speed, the feed speed of each axis, and the spindle rotational speed are determined in accordance with the calculated position of the operator. Then, the operation speed of the machine tool is set based on the contents of settings thus determined.

Since the sensor originally provided for safety measures against the robot is used, there is no need to add a sensor and wiring for the machine tool, and it is possible to implement a machining system that can efficiently ensure the safety of the operator by changing the operation speed of the machine tool along with the robot while monitoring the position of the operator.

An outline of a machining system in an embodiment of the present invention will be described by using FIG. 1.

Figure 1:
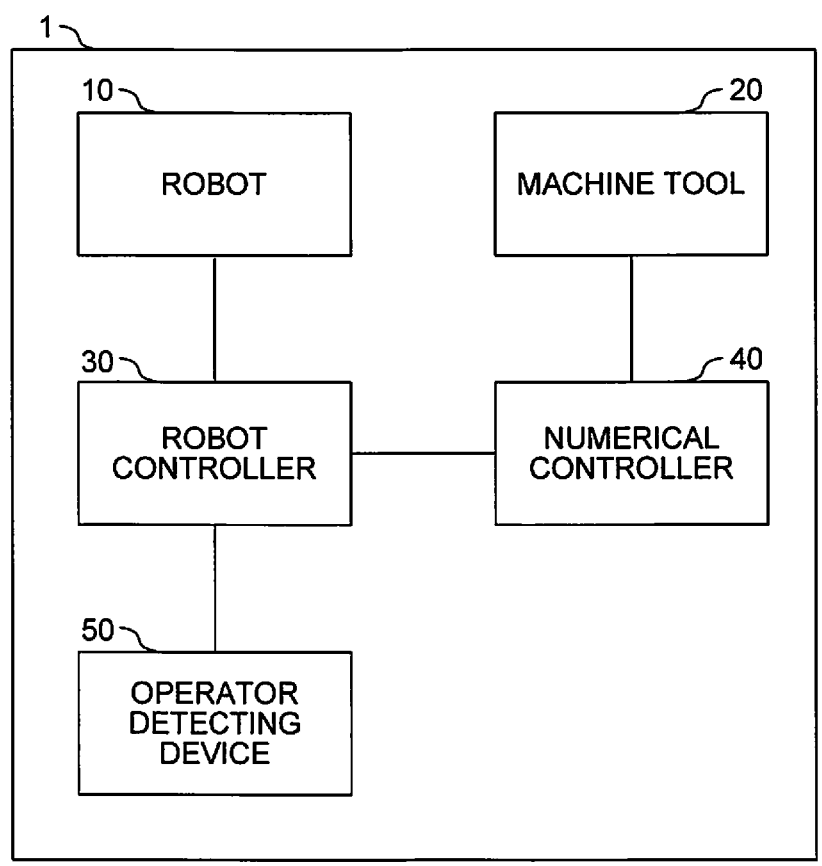
FIG. 1 is a block diagram of principal portions of a machining system in an embodiment of the present invention.

As depicted in FIG. 1, a machining system 1 in this embodiment is formed of a robot 10 and a machine tool 20, and a robot controller 30 is connected to the robot 10 and a numerical controller 40 is connected to the machine tool 20.

An operator detecting device 50 includes a sensor (not shown) which measures the position of an operator as safety measures against the robot 10, and detects the position of the operator in a work area based on the measurement result output from the sensor and outputs the detection result to the robot controller 30. Then, the robot controller 30 imposes an operation restriction on the robot 10 by using the detection result output from the operator detecting device 50.

Figure 2:
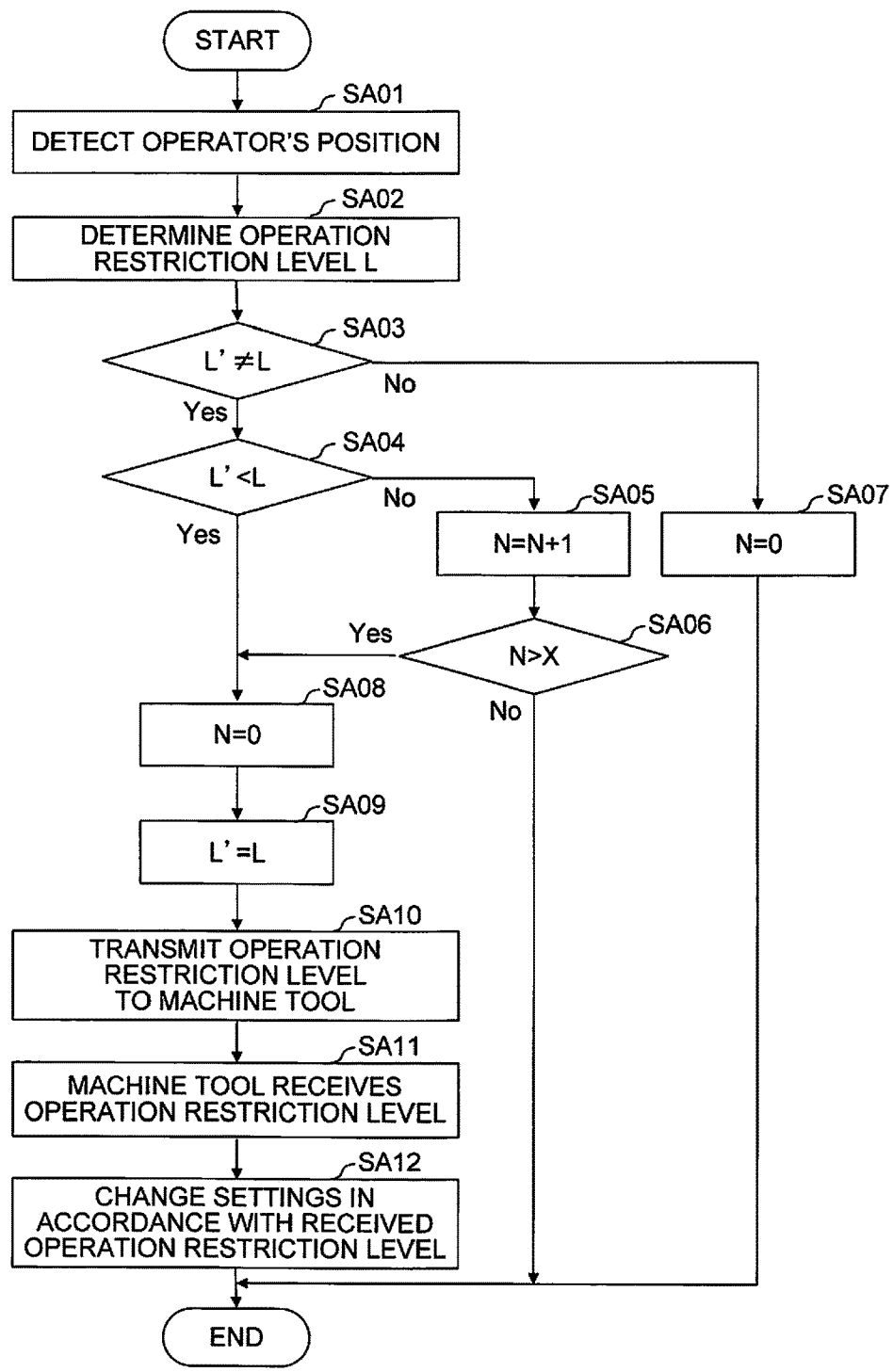
FIG. 2 is a flowchart depicting the flow of processing which is performed on the machining system depicted in FIG. 1.

The overall flow of the operation of the machining system 1 in this embodiment is depicted in a flowchart of FIG. 2.

In this embodiment, at least two operation restriction levels L are set for the machine tool 20 and operation restrictions (a restriction on the maximum speed observed when a door is opened and closed, restriction on the maximum table feed speed observed when the door is opened, restriction on the maximum spindle rotational speed, and notification provided by beep tones or warning lights, and so forth) corresponding to each operation restriction level are registered in the machine tool 20. The operation restriction levels are expressed as $L_1, L_2, \ldots$ and it is assumed that the greater a number in a numerical subscript becomes, the more stringent the restrictions become. Moreover, a counter N which is used when the operation restriction level is lowered and a threshold value X which is used to determine whether the operation restriction is made less stringent are prepared. In addition, L' is an internal variable in the robot controller 30 which stores the operation restriction level which is currently set for the machine tool 20. Incidentally, processing of FIG. 2 is periodically executed once every given length of time.

[Step SA01] The operator detecting device 50 detects the position of the operator based on the measurement result obtained by the sensor provided for safety measures against the robot 10 and outputs the detection result to the robot controller 30.

[Step SA02] The robot controller 30 determines the operation restriction level L based on the position of the operator detected in Step SA01 in accordance with a fixed algorithm (which will be described later).

[Step SA03] The robot controller 30 determines whether or not the operation restriction level L' which is currently set for the machine tool 20 agrees with the operation restriction level L determined in Step SA02. If the operation restriction level L' does not agree with the operation restriction level L, the procedure proceeds to Step SA04; if the operation restriction level L' agrees with the operation restriction level L, the procedure proceeds to Step SA07.

[Step SA04] The robot controller 30 compares the operation restriction level L' which is currently set for the machine tool 20 with the operation restriction level L determined in Step SA02. If the operation restriction level L' is lower than the operation restriction level L (L'<L), the procedure proceeds to Step SA08; if operation restriction level L' is not lower than the operation restriction level L, the procedure proceeds to Step SA05.

[Step SA05] The robot controller 30 increments the counter N by 1 (N←N+1).

In this step, immediate transmission of the operation restriction level is not performed because the operation restriction level L determined in Step SA02 is lower than the operation restriction level L' which is currently set for the machine tool 20 and such a transmission causes a change in a dangerous direction.

[Step SA06] The robot controller 30 compares the counter N with the threshold value X of a confirmatory period which is set in advance. If the counter N is greater than the threshold value X, the procedure proceeds to Step SA08; if the counter N is not greater than the threshold value X, the present processing in this period is ended.

[Step SA07] The robot controller 30 clears the counter N and ends the present processing in this period.

[Step SA08] The robot controller 30 clears the counter N.

[Step SA09] The robot controller 30 updates the operation restriction level L which is set for the machine tool 20 to L' (L'←L).

[Step SA10] The robot controller 30 transmits the operation restriction level L' updated in Step SA09 to the machine tool 20.

[Step SA11] The machine tool 20 receives the updated operation restriction level L'.

[Step SA12] The machine tool 20 reflects the settings of the operation restrictions allocated in advance on the machining operation and the operations of peripheral devices and the like in accordance with the operation restriction level L' thus received.

Incidentally, in the process flow described above, as operation restriction, the operation restriction levels are set for the machine tool 20 in advance, the operation restrictions on the machine tool 20 are allocated to each operation restriction level, and, when the operation restriction level determined by the robot controller 30 is received, the settings of the operation restrictions allocated to the received operation restriction level are reflected on the machining operation and the operations of peripheral devices and the like. Alternatively, a method in which the operation restriction levels are not set and the robot 10 directly determines the operation restrictions on the machine tool 20 and transmits the determined operation restrictions may be adopted.

Figure 3:
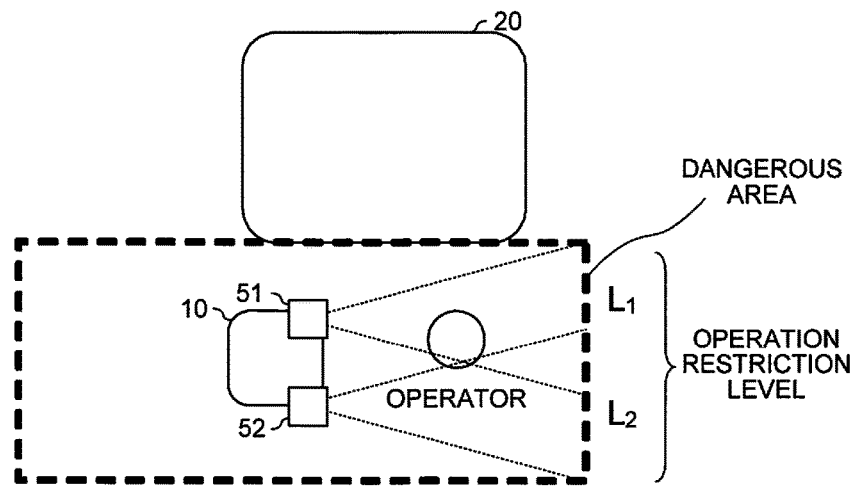
FIG. 3 depicts an example of a machining system in which two sensors that detect the presence or absence of an operator are provided in a robot and an operation restriction level is changed in accordance with the state of detection of the operator by the sensors.

FIG. 3 depicts an example of a machining system in which sensors 51 and 52 that detect the presence or absence of the operator, such as two area sensors, are provided, as the operator detecting device 50, in the robot 10 and the operation restriction level is changed in accordance with the state of detection of the operator by each of the sensors 51 and 52.

The robot 10 includes first and second sensors 51 and 52 and is set in advance so as to determine that the operation restriction level is $L_1$ if the operator enters an area on the side where the first sensor 51 is located, determine that the operation restriction level is $L_2$ if the operator enters an area on the side where the second sensor 52 is located, and determine that the operation restriction level is $L_3$ if the operator is not sensed by the sensors 51 and 52.

Figure 4:
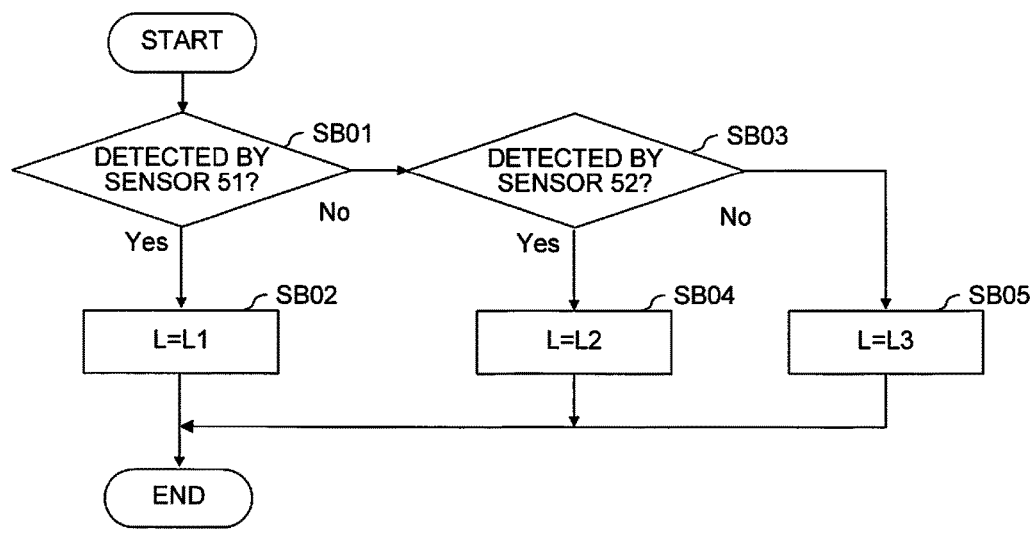
FIG. 4 is a flowchart depicting an algorithm (processing in Step SA02 of FIG. 2) by which a robot controller determines the operation restriction level based on the measurement results obtained by a plurality of sensors in the machining system of FIG. 3.

FIG. 4 is a flowchart depicting an algorithm (processing in Step SA02 of FIG. 2) by which the robot controller 30 determines the operation restriction level based on the measurement results obtained by the first and second sensors 51 and 52 in the machining system configured as depicted in FIG. 3.

[Step SB01] A determination as to whether or not the first sensor 51 detects an operator is made. If the first sensor 51 detects the operator, the procedure proceeds to Step SB02; if the first sensor 51 does not detect the operator, the procedure proceeds to Step SB03.

[Step SB02] A determination is made that the operation restriction level L is $L_1$.

[Step SB03] A determination as to whether or not the second sensor 52 detects an operator is made. If the second sensor 52 detects an operator, the procedure proceeds to Step SB04; if the second sensor 52 does not detect an operator, the procedure proceeds to Step SB05.

[Step SB04] A determination is made that the operation restriction level L is $L_2$.

[Step SB05] A determination is made that the operation restriction level L is $L_3$.

Incidentally, in the example of FIGS. 3 and 4, the two sensors are used, but the number of sensors is not limited as long as one or more sensors are used. Moreover, sensors, each adopting one of a plurality of different types of detection methods, may be provided and the operation restriction level may be determined depending on a combination of these sensors.

Figure 5:
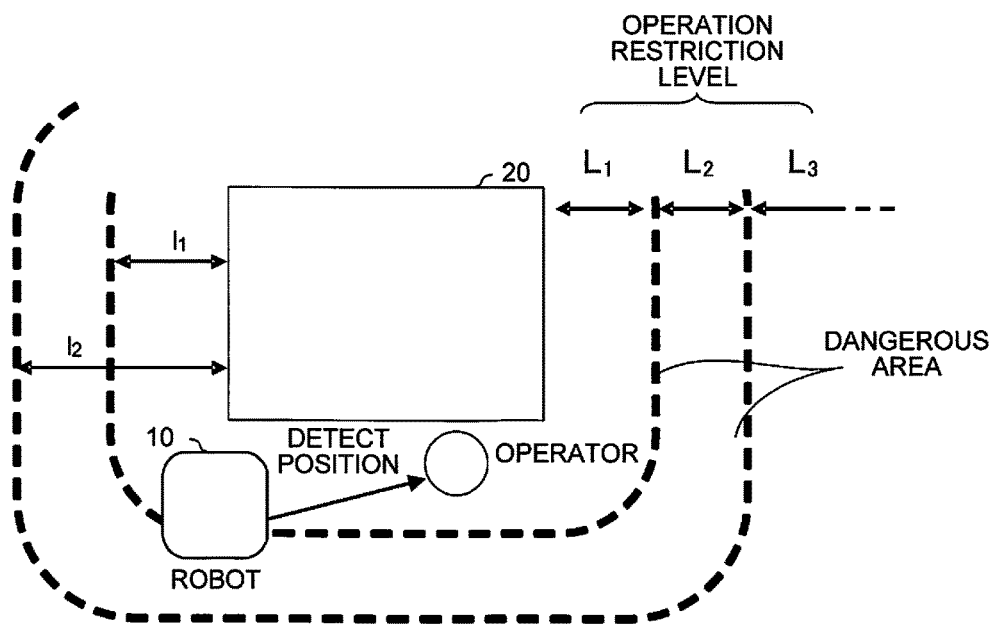
FIG. 5 depicts an example of a machining system in which the operation restriction level of a machine tool is changed in accordance with the position of an operator that is detected by a sensor which outputs the position of the operator viewed from a robot.

FIG. 5 depicts an example of a machining system in which a sensor (not shown) which outputs the position of an operator viewed from the robot 10 is provided, as the operator detecting device 50, in the robot 10 and the operation restriction level of the machine tool 20 is changed in accordance with the position of the operator detected by the sensor.

In this embodiment, the robot controller 30 (not shown) calculates the distance between the robot 10 and the operator by using the detection result output from the operator detecting device 50 and imposes operation restrictions on the robot 10 based on the distance thus calculated.

Moreover, in a memory of the robot controller 30, the distance between the robot 10 and the machine tool 20 and the configuration of the robot 10 and the machine tool 20 are registered in advance, and the robot controller 30 calculates the distance between the machine tool 20 and the operator based on the registered distance and configuration.

In the memory of the robot controller 30, settings are stored in advance such that a determination is made that the operation restriction level is $L_1$ if the operator is within a range of $l_1$ from the machine tool 20, a determination is made that the operation restriction level is $L_2$ if the operator is within a range of $l_2$ from the machine tool 20, and a determination is made that the operation restriction level is $L_3$ if the operator is outside the ranges of $l_1$ and $l_2$, and the operation restriction level of the machine tool 20 is determined by a comparison with the calculated distance between the machine tool 20 and the operator.

Figure 6:
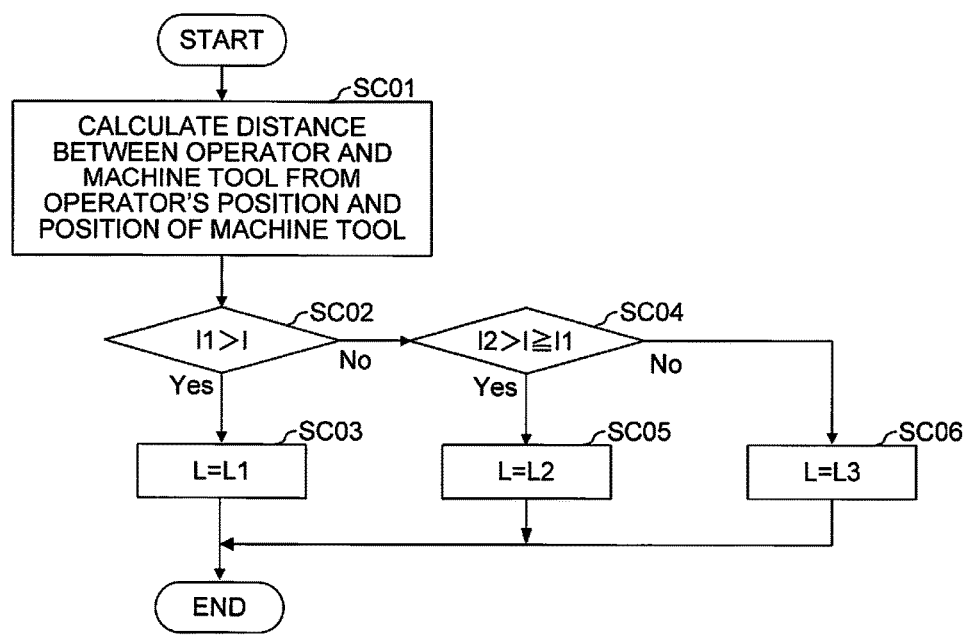
FIG. 6 is a flowchart depicting an algorithm (processing in Step SA02 of FIG. 2) by which the robot controller determines the operation restriction level of the machine tool based on the measurement result obtained by the sensor in the machining system of FIG. 5.

FIG. 6 is a flowchart depicting an algorithm (processing in Step SA02 of FIG. 2) by which the robot controller 30 determines the operation restriction level of the machine tool 20 based on the measurement result obtained by the sensor in the machining system configured as depicted in FIG. 5.

[Step SC01] The position of an operator is detected by the sensor provided in the robot 10, and the distance between the operator and the machine tool 20 is calculated from the detected position of the operator and the position of the machine tool 20 stored in the memory.

[Step SC02] A determination as to whether or not the distance calculated in Step SC01 is smaller than $l_1$ is made. If the distance calculated in Step SC01 is smaller than $l_1$, the procedure proceeds to Step SC03; otherwise, the procedure proceeds to Step SC04.

[Step SC03] A determination is made that the operation restriction level L is $L_1$.

[Step SC04] A determination as to whether or not the distance calculated in Step SC01 is smaller than $l_2$ is made. If the distance calculated in Step SC01 is smaller than $l_2$, the procedure proceeds to Step SC05; otherwise, the procedure proceeds to Step SC06.

[Step SC05] A determination is made that the operation restriction level L is $L_2$.

[Step SC06] A determination is made that the operation restriction level L is $L_3$.

Incidentally, in the example of FIGS. 5 and 6, the number of operation restriction levels is three, but the number of operation restriction levels is not limited as long as there are two or more operation restriction levels.

While the embodiment of the present invention has been described above, the present invention is not limited to the example of the embodiment described above and can be carried out in various modes by being modified as appropriate.

For example, in the embodiment described above, the robot controller 30 is configured so as to determine the operation restriction level of the machine tool 20 by using the detection result obtained by the sensor provided for safety measures against the robot 10. Alternatively, the numerical controller 40 may be configured so as to determine the operation restriction level of the robot 10 by using the detection result obtained by a sensor provided for safety measures against the machine tool 20. In that case, it is necessary simply to interchange the role of the robot 10 and the role of the machine tool 20 in the above description.

The invention claimed is:

1. A machining system, comprising:
   a machine tool;
   a numerical controller configured to control the machine tool;
   a robot;
   a robot controller configured to control the robot to perform operations; and
   an operator detecting device configured to detect whether or not an operator is present in an area in which the operator in the machining system is exposed to danger, wherein
   the robot controller includes
      an operation determining portion configured to determine an operation restriction on the machine tool based on a detection result obtained by the operator detecting device, and
      a notifying portion configured to notify the numerical controller of the operation restriction determined by the operation determining portion, and
   the numerical controller is configured to restrict an operation of the machine tool in accordance with the operation restriction notified by the notifying portion.

2. The machining system according to claim 1, wherein the operation determining portion comprises an operator's position calculating portion configured to calculate a distance between the machine tool and the operator from the detection result obtained by the operator detecting device, and
   the operation determining portion is configured to determine, based on an operator's position calculation result obtained by the operator's position calculating portion, the operation restriction on the machine tool.

3. The machining system according to claim 1, wherein the operation determining portion
   has at least two operation restriction levels,
   includes a memory that stores contents and settings of operation restrictions corresponding to the operation restriction levels, and
   is configured to set one of the operation restrictions stored in the memory as the operation restriction to be imposed on the machine tool, in response to a selection of a corresponding operation restriction level among the at least two operation restriction levels.

4. The machining system according to claim 1, wherein the operator detecting device is a single operator detecting device that covers the entire machining system.

5. The machining system according to claim 1, wherein the operator detecting device comprises
   a first sensor which is set in advance so as to determine a first operation restriction level, and
   a second sensor which is set in advance so as to determine a second operation restriction level different from the first operation restriction level.

6. A machining system, comprising:
   a machine tool;
   a numerical controller configured to control the machine tool;
   a robot;
   a robot controller configured to control the robot to perform operations; and
   an operator detecting device configured to detect whether or not an operator is present in an area in which the operator in the machining system is exposed to danger, wherein
   the numerical controller includes
      an operation determining portion configured to determine an operation restriction on the robot based on a detection result obtained by the operator detecting device, and
      a notifying portion configured to notify the robot controller of the operation restriction determined by the operation determining portion, and
   the robot controller is configured to restrict an operation of the robot in accordance with the operation restriction notified by the notifying portion.

7. The machining system according to claim 6, wherein the operation determining portion comprises an operator's position calculating device configured to calculate a distance between the robot and the operator from the detection result obtained by the operator detecting device, and
   the operation determining portion is configured to determine, based on an operator's position calculation result obtained by the operator's position calculating device, the operation restriction on the robot.

8. The machining system according to claim 6, wherein the operation determining portion
   has at least two operation restriction levels,
   includes a memory that stores contents and settings of operation restrictions corresponding to the operation restriction levels, and
   is configured to set one of the operation restrictions stored in the memory as the operation restriction to be imposed on the machine tool, in response to a selection of a corresponding operation restriction level among the at least two operation restriction levels.

9. The machining system according to claim 4, wherein the single operator detecting device comprises a sensor originally provided for safety measures against the robot.

10. The machining system according to claim 6, wherein the operator detecting device is a single operator detecting device that covers the entire machining system.

11. The machining system according to claim 10, wherein the single operator detecting device comprises a sensor originally provided for safety measures against the robot.

12. The machining system according to claim 6, wherein the operator detecting device comprises
- a first sensor which is set in advance so as to determine a first operation restriction level, and
- a second sensor which is set in advance so as to determine a second operation restriction level different from the first operation restriction level.

\* \* \* \* \*